3,322,694
N-CONTAINING ORGANOSILICON POLYMER
George E. Ham, Lake Jackson, Tex., assignor to The Dow Chemical Company, Midland, Mich., a corporation of Delaware
No Drawing. Filed Dec. 5, 1963, Ser. No. 328,200
11 Claims. (Cl. 260—2)

This invention relates to new compositions of matter and to a method for the preparation of such compositions. More particularly, the present invention relates to polymers of silicon esters which contain at least one heterocyclic ring composed of two carbon atoms and one nitrogen atom.

Silicon compounds which contain an aziridine ring directly bonded to the silicon atom through the nitrogen atom are disclosed in German Patent 834,990 by Heyna et al.

It has now been found that useful polymers in which each of the N-containing heterocyclic rings is separated from each silicon atom by a chain containing at least two carbon atoms and at least one oxygen atom can be prepared by reacting (a) a silicon ester which contains an epoxy group with (b) aziridine or a substituted aziridine compound characterized by the presence of a hydrogen atom bonded to the heterocyclic nitrogen atom. The novel polymers of the invention are formed by polymerization through the epoxy linkage rather than through the aziridinyl linkage.

The polymers of the invention are prepared according to the following reaction

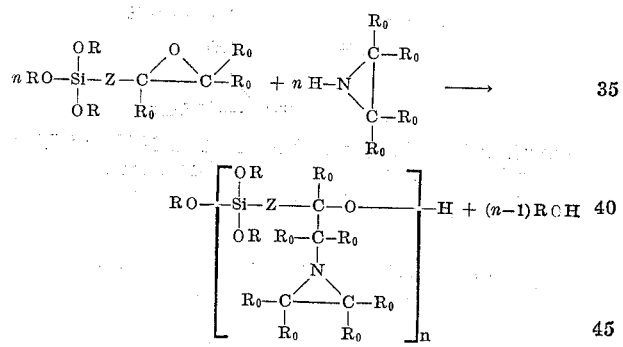

wherein $n$ is an integer from about 1000 to 5000 (preferably from about 2500 to 3500), each $R_0$ is a hydrogen atom or a lower alkyl group of from 1 to 4 carbon atoms (methyl, ethyl, n-propyl, i-propyl, n-butyl, i-butyl, sec.-butyl, tert.-butyl), each R is a lower alkyl group of from 1 to 4 carbon atoms (preferably a methyl group) and Z is any inert divalent organic radical of up to about 20 carbon atoms such as a hydrocarbon group of from 1 to 10 carbon atoms (methylene, ethylene, butylene, phenylene, xenylene, tolylene or

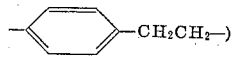

or a divalent ether group of the type $(R'OR'')_x$ wherein each of R' and R'' may be any Z group previously described and $x$ is an integer of from 1 to 6. Suitable $(R'OR'')$ groups include:

—CH$_2$CH$_2$OCH$_2$CH$_2$—

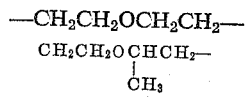

—CH$_2$(OCH$_2$CH$_2$)$_6$OCH$_2$CH$_2$CH$_2$—

—CH$_2$OCH$_2$CH$_2$OCH$_2$CH$_2$— and

—CH$_2$OCH$_2$CH=CH—

Preferred $(R'OR'')$ groups are those in which each of R' and R'' are lower alkylene groups of from 1 to 4 carbon atoms (methylene, ethylene, propylene, butylene).

Typical aziridinyl starting materials include 2,3-dimethyl-aziridine, 2,3-dimethyl-2,3-diethyl-aziridine, 2-methyl-aziridine, 2-n-propyl-aziridine and 2-n-butyl-aziridine. Each of these reactants yields the corresponding polymer when reacted with an epoxy-containing silicon ester wherein each R group may be the same or a different lower alkyl group. Preferably, each R is a methyl group. The end groups in the macromolecule form a very small (from about 0.05 to 0.6 percent by weight) percentage of the molecule. The amount of hydroxyl end groups may be from about .02 to .3 percent by weight (based on the total molecular weight of the molecule). By mixing various aziridinyl compounds with mixtures of siloxanes containing different alkyl groups (for example, methyl groups and ethyl groups), polymers with differing chain units may be obtained in the same macromolecule.

The starting silicon esters which are employed in the process of the invention are prepared by various methods, for example, by carrying out an addition reaction with a tri(alkoxy)silane and a compound such as an allyl glycidyl ether or an unsaturated epoxide with a single oxygen atom in the presence of a silane addition catalyst (such as platinum or an organic peroxide) or by the epoxidation of an organosilicon compound containing a C=C group in the molecule as disclosed in Canadian Patent No. 580,908 (issued Aug. 4, 1959) by Edwin P. Plueddemann, the teachings of which are herein incorporated by reference.

The polymers of the invention are prepared by merely heating the silicon ester with the aziridinyl compound at a temperature sufficient to initiate polymerization. Temperatures of from 40° to 100° C. may be used. An excess of aziridinyl compound is ordinarily employed in the reaction (up to 100 moles of aziridinyl compound per mole of silicon ester may be used). An amount of aziridinyl compound sufficient to provide one aziridinyl group

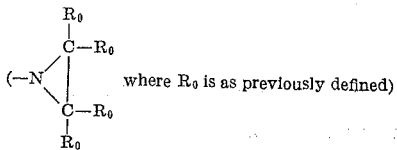  where $R_0$ is as previously defined)

for each epoxy

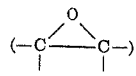

group should be used (i.e., the mole ratio of aziridinyl compound to silicon ester should be at least 1:1). Pressures of from 0.5 atmosphere to 100 atmospheres may be used. Preferably, the process is carried out by refluxing a mixture of silicon ester and aziridinyl compound at atmospheric pressure using temperatures of from 50° to 70° C., with a mole ratio of aziridinyl compound to silicon ester of at least 1:1. The reaction is ordinarily carried out at temperatures below 280° C.

The products of the invention are rubbery solids which are useful in the formation of resilient bushings and sealers. The mixtures may be polymerized in situ to form useful laminates (wood, metal, plastic) and coatings which are very resistant to water and organic solvents (such as CCl$_4$). The polymeric products also have excellent heat-resistant properties and are good heat insulators.

The following example is submitted for the purpose of illustration only and is not to be construed as limiting the scope of the invention in any way.

EXAMPLE

Into a reaction vessel equipped with a means for stirring and temperature control was placed 20.0 grams of 9,10-epoxy-3,3-dimethoxy-2,7-dioxa-3-siladecane and 200 milliliters (about 170 grams) of ethylenimine. The mixture was refluxed for 7 hours at 58° C. and then allowed to stand overnight. The unreacted ethylenimine was removed under reduced pressure and 20.0 grams of a white rubbery solid was obtained. The solid product was insoluble in $H_2O$ and $CCl_4$ and did not melt. The rubbery polymer decomposed at about 280° C. The infrared spectrum indicated the presence of a carbon-oxygen bond (C—O), a silicon-oxygen bond (Si—O) and an unsubstituted aziridinyl group

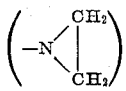

Based upon the infrared spectrum, the amount of hydroxyl end group was estimated as approximately 0.2 percent by weight. This corresponds to a molecular weight of about 848,000 for the polymer

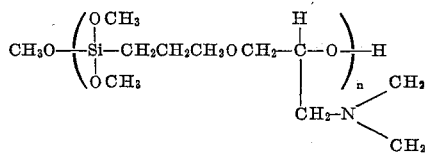

where $n$ has an average value of 3430, based upon a monomer unit with a molecular weight of 247. Analysis of a sample of the product for nitrogen and silicon showed the ratio of nitrogen atoms to silicon atoms to be approximately 1:1 (weight ratio N/Si: theory for $C_{10}H_{21}NO_4Si$ =0.498; found 0.484).

Other silicones characterized by the presence of an epoxy group

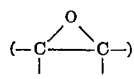

and an —$Si(OR)_3$ group in the molecule react similarly with aziridinyl compounds to produce polymers. Thus, ethylenimine or propylene imine reacts with

to produce aziridinyl polymers.

I claim as my invention:

1. A macromolecular compound of the formula

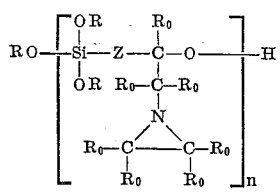

wherein:
 (a) each $R_0$ is selected from the group consisting of the hydrogen atom and a lower alkyl group of from 1 to 4 carbon atoms,
 (b) each R represents a lower alkyl group of from 1 to 4 carbon atoms,
 (c) Z is an inert divalent hydrocarbon or hydrocarbon ether group of up to about 20 carbon atoms, and
 (d) $n$ is an integer of from 1000 to 5000.

2. A compound according to claim 1 wherein Z is a divalent group selected from the group consisting of a hydrocarbon of from 1 to 10 carbon atoms and an ether group of the formula $\text{-(R'OR'')}_x\text{-}$ wherein $x$ is an integer of from 1 to 6 and each of R' and R" is an alkylene group of from 1 to 4 carbon atoms.

3. A macromolecular compound of the formula

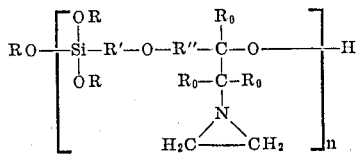

wherein:
 (a) each $R_0$ is hydrogen or an alkyl group of 1 to 4 carbon atoms,
 (b) each R is a lower alkyl group of from 1 to 4 carbon atoms,
 (c) each of R' and R" is an alkylene group of from 1 to 4 carbon atoms, and
 (d) $n$ is an integer from 1000 to 5000.

4. A macromolecular compound of the formula

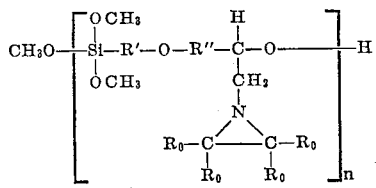

wherein:
 (a) each $R_0$ is independently selected from the group consisting of the hydrogen atom and a lower alkyl group of from 1 to 4 carbon atoms,
 (b) each of R' and R" is an alkylene group of from 1 to 4 carbon atoms, and
 (c) $n$ is an integer of from 1000 to 5000.

5. A macromolecular compound of the formula

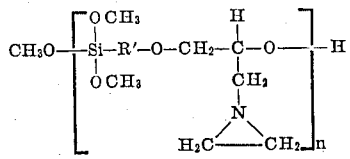

wherein $n$ is an integer of from 1000 to 5000 and R' is an alkylene group of from 1 to 4 carbon atoms.

6. A macromolecular compound of the formula

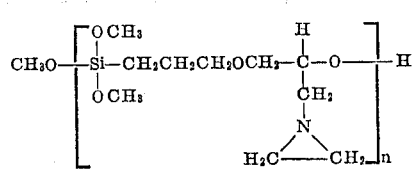

wherein $n$ is an integer of from 1000 to 5000.

7. A mixture of compounds of the formula

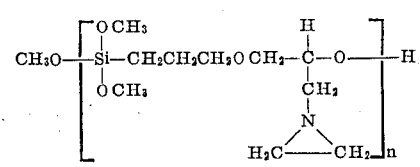

wherein $n$ is a number with an average value of from 2500 to 3500.

8. A compound of the formula

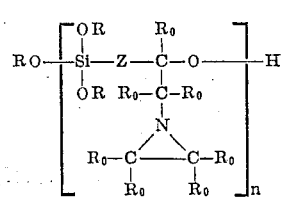

wherein:
 (a) Z is a divalent hydrocarbon group selected from the group consisting of an alkylene group of from 1 to 4 carbon atoms, phenylene, xenylene, tolylene and the group

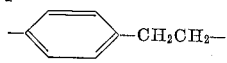

(b) each $R_0$ is selected from the group consisting of a hydrogen atom and a lower alkyl group of from 1 to 4 carbon atoms,
(c) $n$ is an integer of from 1000 to 5000, and
(d) each R group represents a lower alkyl group of from 1 to 4 carbon atoms.

9. A process of preparing a macromolecular compound which comprises reacting at a temperature of 40 to 100° C.:
(1) a compound of the formula

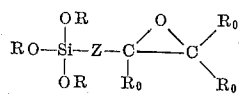

with
(2) an aziridinyl compound of the formula

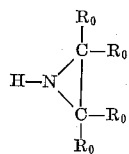

wherein:
(a) each $R_0$ is selected from the group consisting of the hydrogen atom and a lower alkyl group of from 1 to 4 carbon atoms,
(b) each R represents a lower alkyl group of from 1 to 4 carbon atoms, and
(c) Z is a divalent group selected from the group consisting of a hydrocarbon of from 1 to 10 carbon atoms and an ether group of the formula $(R'OR'')_x$ wherein $x$ is an integer of from 1 to 6 and each of R' and R'' is an alkylene group of from 1 to 4 carbon atoms.

10. The process of claim 9 wherein the mole ratio of (2) to (1) is at least 1:1.

11. The process of claim 9 wherein the reaction is carried out at a temperature of 40 to 100° C.

References Cited
UNITED STATES PATENTS 3,243,429  3/1966  Ham _____ 260—448.2

LEON J. BERCOVITZ, *Primary Examiner.*

M. I. MARQUIS, *Assistant Examiner.*